(12) United States Patent
Rau, III

(10) Patent No.: US 6,530,458 B1
(45) Date of Patent: Mar. 11, 2003

(54) LIGHTWEIGHT REINFORCED BRAKE DRUM AND METHOD FOR MAKING LIGHTWEIGHT REINFORCED BRAKE DRUM

(76) Inventor: Charles B. Rau, III, 30947 Steeplechase, San Juan Capistrano, CA (US) 92675

( * ) Notice: Subject to any disclaimer, the term of this patent is extended or adjusted under 35 U.S.C. 154(b) by 0 days.

(21) Appl. No.: 08/906,135

(22) Filed: Jul. 25, 1997

Related U.S. Application Data

(63) Continuation of application No. 08/607,935, filed on Feb. 28, 1996, now abandoned.

(51) Int. Cl.[7] .............................................. F16D 65/10
(52) U.S. Cl. ................... 188/218 R; 188/17; 188/18 R; 192/107 M
(58) Field of Search ............... 188/218 R, 17, 188/18 R; 192/107 M

(56) References Cited

U.S. PATENT DOCUMENTS

| 1,678,777 A | 7/1928 | Hansen et al. .......... 188/218 R |
| 1,727,486 A | 9/1929 | Sauzedde ................ 188/218 R |
| 1,746,494 A | 2/1930 | Norton ................... 188/218 R |
| 1,989,211 A | 1/1935 | Norton ................... 188/218 R |
| 2,844,229 A | * 7/1958 | Whitfield ................ 188/218 R |
| 2,978,073 A | 4/1961 | Soddy |
| 3,005,259 A | 10/1961 | Benya et al. .................. 29/505 |
| 3,007,553 A | * 11/1961 | Sinclair et al. ......... 188/218 R |
| 3,066,766 A | 12/1962 | Minor et al. .................. 188/78 |
| 3,090,114 A | 5/1963 | Sinclair ....................... 29/447 |
| 3,841,448 A | 10/1974 | Norton, Jr. ............. 188/218 R |
| 4,266,638 A | * 5/1981 | Petersen et al. ........ 188/218 R |
| 4,577,734 A | 3/1986 | Williams ................ 188/218 R |
| 4,679,681 A | 7/1987 | Creydt et al. .......... 192/107 M |
| 4,694,937 A | 9/1987 | Jonas ..................... 188/250 G |
| 5,103,942 A | 4/1992 | Schmitt ................... 188/251 R |
| 5,325,941 A | 7/1994 | Farinacci et al. ....... 188/218 X |

* cited by examiner

Primary Examiner—Robert J Oberleitner

(57) ABSTRACT

The invention provides a lightweight brake drum (10) having a lightweight, tubular inner member (14), a length of wire (16) wrapped around the inner member (14) and an outer shell (18). The inner member (14) and the outer shell (18) are made of a lightweight material. Typically, multiple layers of length of wire (16) are wrapped around the inner member (14) to support and inhibit expansion of the inner member (14). Since the length of wire (16) provides support against expansion, the inner member (14) and the outer shell (18) can be made of lightweight materials.

4 Claims, 2 Drawing Sheets

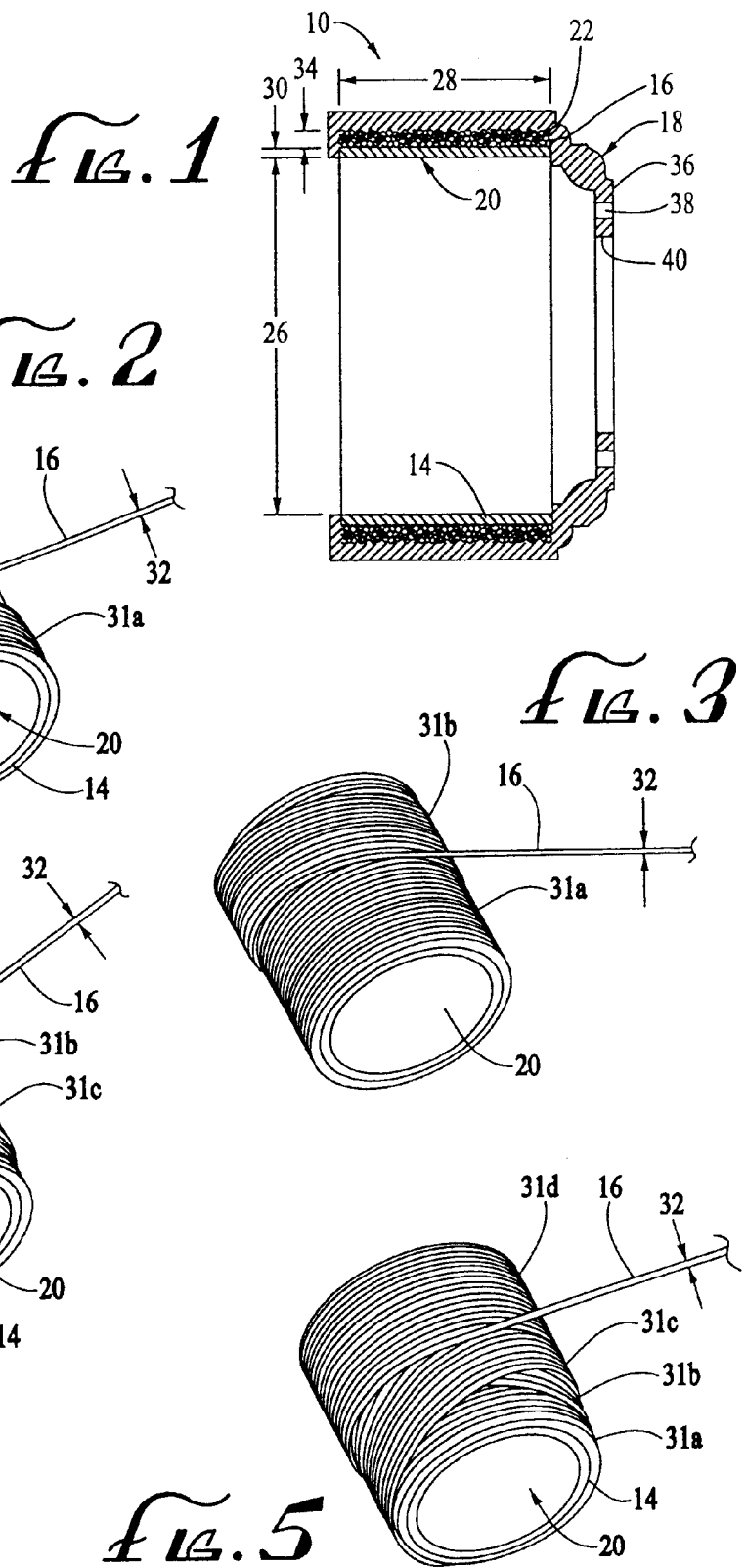

LIGHTWEIGHT REINFORCED BRAKE DRUM AND METHOD FOR MAKING LIGHTWEIGHT REINFORCED BRAKE DRUM

This application is a continuation of application Ser. No. 08/607,935, filed Feb. 28, 1996 now abandoned.

FIELD OF THE INVENTION

This invention relates generally to the field of brake drums for motor vehicles, and specifically to the field of lightweight brake drums.

BACKGROUND

Brake shoe and brake drum-type brakes have been used on motor vehicles for many years. While many automobiles now use disc-type brakes, brake shoe and brake drum-type brakes are still used in many automobiles, and especially for braking the rear wheels in almost all heavy duty trucks.

The weight of a motor vehicle's brake drums has become increasingly important to the vehicle manufacturer and to the vehicle operator. First of all, the weight of the vehicle's brake drums affects the mileage efficiency of the vehicle. This factor is becoming increasingly important to the manufacturers of automobiles sold in the United States. The Federal Government is putting considerable pressure on automobile manufacturers to continuously increase the mileage efficiency of their automobile line. Automobile manufacturers are presently undertaking a frantic search to reduce the weight requirements on even the smallest automobile component.

The weight of brake drums is even more important to truck manufacturers. The weight of a truck's brake drum not only affects the truck's mileage efficiency but also directly affects the amount of cargo which can be transported by a truck. This stems from the fact that governmental regulations strictly limit the gross weight of all commercial vehicles. Thus, any savings in the weight of a commercial vehicle allows the owner of that vehicle to carry a like quantity of additional weight. In the highly competitive trucking industry, the total quantity of freight which can be transported per load is critical to profitability.

Conventional brake drums are manufactured from ductile iron, cast iron or steel. A typical large truck brake drum weighs about 120 pounds. Attempts have been made to reduce this weight by manufacturing the drums from lighter materials, such as aluminum and aluminum alloys. However, the use of lighter materials is restricted by strength requirements. For example, a typical truck brake drum must have an internal yield strength in excess of 40,000 psi. Brake drums constructed from aluminum and aluminum alloys alone do not have this high of an internal yield strength.

In an attempt to take advantage of lightweight materials while retaining adequate strength requirements, several attempts have been made to use brake drums made of a combination of lightweight and heavier materials. For example, in U.S. Pat. No. 1,989,211, a bimetallic brake drum is proposed which comprises a cast aluminum housing in combination with a steel internal liner. The resulting brake drum is lighter than conventional brake drums and has sufficient internal yield strength. However, such a drum is not fully satisfactory. For one thing, the steel liner must be relatively thick to provide for adequate wear life. For truck brake drums, the steel liner must be at least 3/8 of an inch thick to obtain sufficient internal yield strength. This means the brake drum remains relatively heavy. For another thing, the internal liner has a strong tendency to slip within the outer housing. This requires that the liner/housing interface be provided with transverse ridges or spines to lock the liner within the housing. (See, for example, U.S. Pat. No. 1,989,211.) In practice, this generally means that the housing and liner must be cast together.

Accordingly, there is a need for a lightweight brake drum which is even lighter than the bimetallic lightweight brake drums of the prior art, a brake drum which does not require ridges or spines between the housing and the liner and a brake drum which does not require dissimilar brake drum components be cast in a single operation.

SUMMARY

The present invention is directed to a brake drum which meets these needs. A brake drum according to the present invention includes a tubular inner member having an interior surface suitable for contacting a brake pad and an exterior surface, a length of wire snugly wrapped around a portion of the exterior surface, and at least one fastener for securing at least a portion of a wheel assembly to the brake drum. Preferably, the brake drum includes a tubular outer shell molded over and substantially covering the length of wire to protect the wire and provide additional support to the brake drum.

As described in detail below, the length of wire wrapped around the tubular inner member supports the inner member. Thus, the inner member and the outer shell of the brake drum can be made from similar, lightweight materials having lower internal yield strengths than the prior art steel brake drums. The term "internal yield strength" as used in this Application means the amount of internal pressure which the brake drum can withstand without failing.

Further, since the inner member and the outer shell can be made of similar materials with similar rates of thermal expansion, the outer shell can be molded over the wires, there is no need for ridges or spines between the inner member and the outer shell.

Preferably, multiple layers of the length of wire are wrapped around substantially the entire exterior surface to support the entire inner member. Preferably, the length of wire has a diameter of between about 0.1 inches and about 0.4 inches, has a tensile strength of at least 180,000 psi and is wrapped at a tension of at least about 25 foot-pounds to provide tight, consistent wrapping of the length of wire around the exterior surface and sufficient support of the inner member.

Since the length of wire supports the inner member and inhibits expansion of the inner member, the inner member and the outer shell can be made from lightweight materials having a density of less than about 0.15 pounds per cubic inch, such as aluminum and aluminum alloys. For example, the inner member can be made of an alloy which includes at least about seventy-five (75) volume percent aluminum and between about ten percent (10%) and about twenty-five percent (25%) abrasive material so that the brake pads can grip against the brake drum.

The invention is also a method for making a brake drum. The method includes manufacturing a tubular inner member and wrapping a length of wire tightly around an exterior surface of the tubular inner member. The method also can include molding an outer shell which substantially covers the length of wire around the exterior surface to provide additional support to the brake drum.

The present invention provides a strong, lightweight brake drum which can be manufactured relatively inexpensively since the inner member and the outer shell can be made from similar materials and there is no need for ridges and spines between the inner member since the outer shell can be molded over the wire.

DRAWINGS

These and other features and aspects and advantages of the present invention will become better understood with reference to the following description, appended claims and accompanying drawings where:

FIG. 1 is a side plan, cut-away view of a brake drum having features of the present invention;

FIG. 2 is a perspective view of a length of wire being wrapped around an exterior surface of a tubular inner member;

FIG. 3 is a perspective view of the tubular inner member of FIG. 2 with two layers of wire wrapped around the exterior surface;

FIG. 4 is a perspective view of the tubular inner member of FIG. 2 with three layers of wire wrapped around the exterior surface;

FIG. 5 is a perspective view of the tubular inner member of FIG. 2 with four layers of wire wrapped around the exterior surface;

DESCRIPTION

Figure 6:
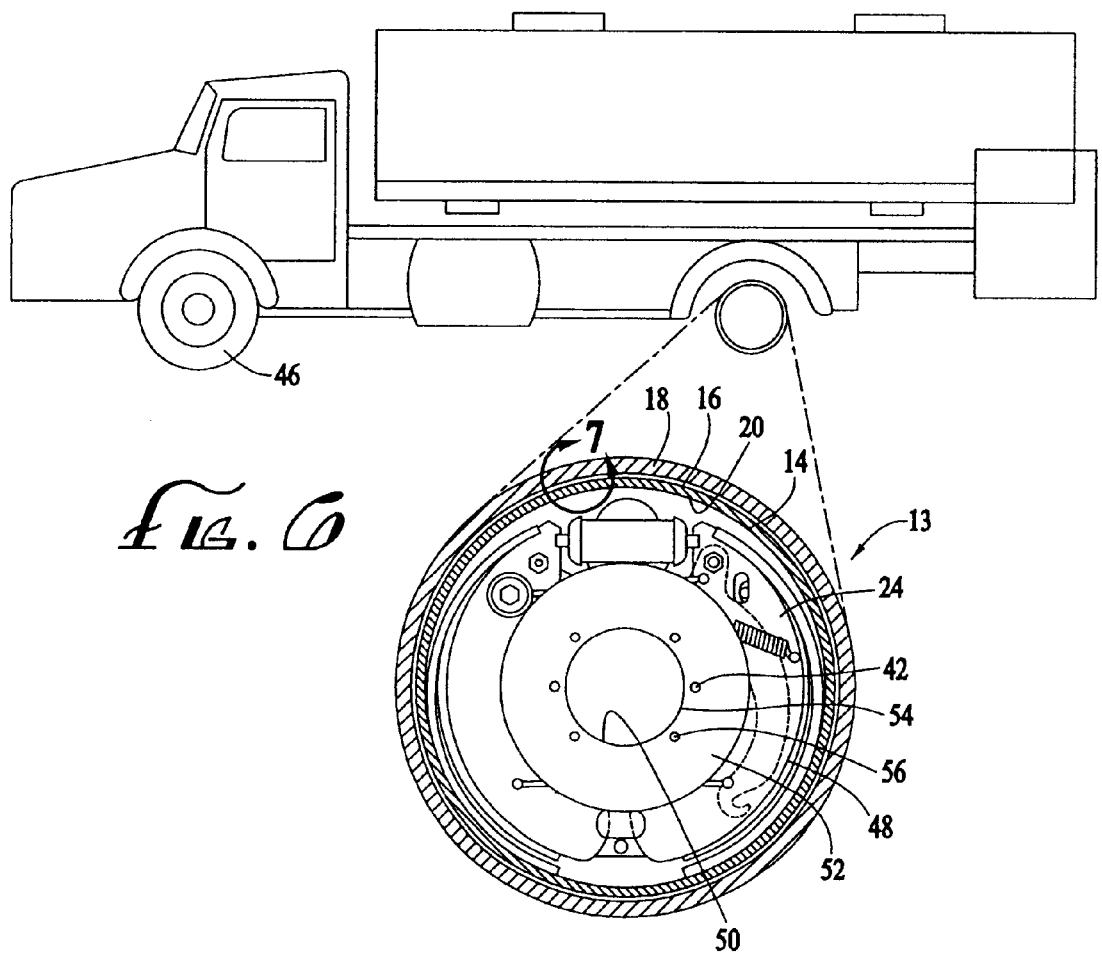
FIG. 6 is a side plan view of a vehicle with an enlarged, cut-away view of a wheel assembly having features of the present invention.
Figure 7:
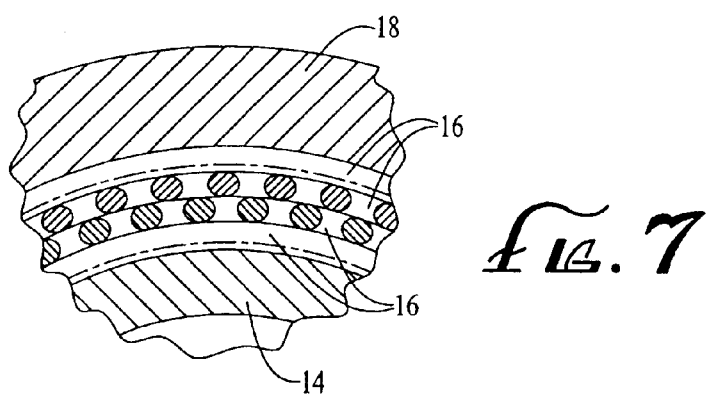
FIG. 7 is an enlarged cross-sectional view taken from line 7—7 in FIG. 6.

The following discussion describes in detail one embodiment of the invention and several variations of that embodiment. This discussion should not be construed as limiting the invention to that particular embodiment or to those particular variations. Practitioners skilled in the art will recognize numerous other embodiments and variations, as well. For definition of the complete scope of the invention, the reader is directed to the appended claims.

With reference to the Figures, the present invention is directed to a lightweight, reinforced brake drum 10 for use with vehicles 12 as part of a wheel assembly 13. The lightweight, reinforced brake drum 10 comprises (i) an inner member 14, (ii) a length of wire 16, and (iii) an outer shell 18.

The inner member 14 is tubular and has an interior surface 20 and an exterior surface 22. The interior surface 20 has a surface finish which is suitable for contacting brake pads 24. A surface finish of at least about one hundred twenty-five (125) microinches RMS is typically sufficient.

Preferably, the inner member 14 is composed of a lightweight material having a density of less than about 0.15 pounds per cubic inch and having a high resistance to corrosive road conditions. Typically, the inner member 14 is composed of an aluminum or an aluminum alloy. Other lightweight materials and alloys, such as magnesium and tinsalloy, can also be used in the invention, as can composite materials such as carbon fiber epoxy resin composites. An alloy which includes at least about seventy-five (75) volume percent aluminum makes an excellent inner member 14.

Preferably, if the material forming the inner member 14 is relatively lightweight and soft, the inner member 14 is mixed with an abrasive so that the interior surface 20 of the inner member 14 has a coefficient of friction and wear resistivity similar to that of prior art brake drums 10 made from iron and steel. Typical abrasives usable in the invention are silicon carbide and carborundum. Where the inner member 14 is composed of an aluminum or aluminum alloy, the composition preferably includes between about ten (10) and twenty-five (25) volume percent abrasives. In preferred embodiments, the inner member 14 material contains between fifteen (15) and twenty-two (22) volume percent abrasives. An excessive amount of abrasive material tends to make the inner member 14 brittle, while an insufficient amount of abrasive material causes the interior surface 20 to be slippery when engaging the brake pads 24 and the interior surface 20 tends to wear too quickly.

If the abrasive material can be silicon carbide particles, the particle size distribution can have a median of between about ten (10) and about twenty (20) micrometers with less than about five percent (5%) of the particles larger than twenty-five (25) micrometers and with no more than about ninety percent (90%) of the particles larger than about five (5) micrometers. Silicon carbon particles which meet FEPA Standard 42-GB-1984 for F500-grit powders can be used in the invention.

A commercially available material known as "Duracon®", marketed by Alcon Aluminum, Ltd., Duralcon U.S.A. of San Diego, Calif., is an excellent material for the inner member 14. Duracon® is a mixture of aluminum/ceramic and about eighteen-twenty-two volume percent (18–22%) of silicon carbide.

The inner member 14 is generally formed by a casting process and the interior surface 20 is machined to obtain the finish suitable for contacting the brake pads 24.

For typical brake drums 10 for use on a heavy-duty truck, the inner member 14 has an internal diameter 26 of about 16½ inches, and a width 28 of about 7 inches. For the material sold under the Duracon® mark, a thickness 30 of the inner member 14 of between about 0.35 inches to about 0.60 inches provides sufficient internal yield strength and wear life when manufactured in accordance with this invention.

The length of the wire 16 is wrapped around a portion of the exterior surface 22. Preferably, multiple layers of the length of wire 16 are wrapped around the entire exterior surface 22 to provide support for the inner member 14. As shown in FIGS. 2–5, the multiple layers of the length of wire 16 can be criss-crossed across the exterior surface 22 to provide better support to the inner member 14. With reference to FIG. 2, a first layer 31a of wire 16 is wrapped substantially straight around the inner member 14. With reference to FIG. 3, a second layer 31b of wire 16 is wrapped at about a ten (10) to thirty (30) degree angle from the first layer 31a. With reference to FIG. 4, a third layer 31c of wire 16 is wrapped at about a twenty (20) to sixty (60) degree angle from the second layer 31b. With reference to FIG. 5, a fourth layer 31d is wrapped substantially similar to the first layer 31a. The required overall thickness of layers of wire 16 depends upon the tensile strength of the length of wire 16.

A length of wire 16 made of a steel alloy having a tensile strength of between about 180,000–240,000 psi and having a diameter 32 of between about 0.05 inches to about 0.25 inches is preferred since this wire can be tightly and consistently wrapped around the inner member 14. For the type of wire detailed above, multiple layers of wire 16 having a combined thickness 34 of between about 0.1 inches to about 0.4 inches provides sufficient support for the brake drum 10. If an insufficient amount of wire 16 is wrapped around the inner member 14, the internal yield strength of the brake drum 10 is too low and the brake drum 10 tends to rupture from internal pressures exerted by the brake pads 24. If too many layers of wire are wrapped around the inner member 14, the internal yield strength is large, the brake drum 10 will be heavier than necessary.

The length of wire 16 is wrapped tightly around the exterior surface 22. Typically, the length of wire 16 is wrapped tightly to have a tension of at least five (5) foot-pounds. Preferably, the length of wire 16 is wrapped to have a tension of at least about twenty (20) to forty-five (45) foot-pounds to obtain the desired internal yield strength of the brake drum 10. Alternately, for a wire 16 having a terisile greater than 240,000 psi, the wire 16 can be wrapped to have a tension which approaches or exceeds about seventy-five (75) foot-pounds. The ends (not shown) of wire 16 can be welded (not shown) to the inner member 14 or to wire 16 to retain the tension on the wire 16.

After the wire 16 is wrapped around the inner member 14, the outer shell 18 is placed over the wire 16 to protect the wire 16 and provide additional strength to the brake drum 10. Typically, the wire wrapped inner member 14 is placed in a mold (not shown) and the outer shell 18 is molded around the exterior surface 22 and the wire 16. The outer shell 18 can be made from a number of lightweight materials such as 356–355 aluminum. Alternately, the outer shell can be comprised of a lightweight material having a density of less than about 0.15 pounds per cubic inch with a high resistance to corrosive road conditions. For example, aluminum or aluminum alloys or other lightweight materials and alloys such as magnesium, tinsalloy can be used in the invention as well as composite materials such as carbon fiber epoxy resin composites.

Preferably, the inner member 14 and the outer shell 18 are made of a material having similar rates of thermal expansion so that the inner member 14 and the outer shell 18 expand at the same rate to prevent separation of the inner member 14 and the outer shell 18.

Similar to prior art brake drums, the outer shell 18 is typically cylindrical shaped. For the version described herein, an outer shell 18 having a thickness 44 of between about 0.75 inches to about 1.25 inches is sufficient.

The brake drum 10 includes at least one fastener 42 for securing the brake drum 10 to a portion of the wheel assembly 13. In the version shown in FIG. 6, each wheel assembly 13 includes a wheel 46, a brake assembly 48, and an axle 50 and a wheel mounting pad 52 having a guidance ring 54 and a plurality of wheel bolts 56. Similar to prior art brake drums, the outer shell 18 can include a front surface 36 having a plurality of guidance bolt apertures 38 and a guidance ring aperture 40 extending therethrough. The wheel bolts 56 extend through bolt apertures 38 and a guidance ring 54 extends through the guidance ring aperture 40 to secure the brake drum 10 to the wheel assembly 13. Alternatively, the front surface 36 could be manufactured as an integral part of the inner member 14 or the brake drum 10 could be attached to the wheel assembly 13 in another fashion.

The invention provides an unusually light brake drum 10 which is comparable to typical brake drums made of steel in terms of internal yield strength, durability and braking power. Compared to typical heavy-duty truck brake drums which weight approximately one hundred twenty (120) pounds, the equivalent brake drum of the present invention having an inner member 14 made of an aluminum alloy/abrasive composition having a thickness of about 0.50 inches, multiple layers of wire 16 having an overall thickness 34 of about 0.3 inches and an aluminum alloy outer shell 18 having a thickness of about 1.25 inches weighs between about forty (40) pounds and about seventy-five (75) pounds. Accordingly, with a heavy-duty semi trailer rig, having four brake pads on the cab and four brake drums on the trailer, an increase in cargo handling capability of between about three hundred sixty (360) pounds and about six hundred forty (640) pounds can be realized. Such increase in cargo capacity can greatly affect the trucker's net profit.

While the present invention has been described in considerable detail with reference to certain preferred versions, other versions are possible. Therefore, the spirit and scope of the appended claims should not be limited to the description of preferred versions contained herein.

What is claimed is:

1. A brake drum comprising:
    (a) a tubular inner member having an exterior surface and an interior surface suitable for directly slidingly contacting a brake pad, the inner member being formed of a first material, the inner member being made of an alloy which includes at least about seventy-five volume percent of aluminum and between about ten volume percent and about twenty-five volume percent abrasive materials;
    (b) a length of wire snugly wrapped in multiple turns around a portion of the exterior surface, the wire being formed of a second material;
    (c) at least one fastener for securing at least a portion of a wheel assembly to the brake drum,
    wherein the first material has a density less than that of the second material, and the second material has a strength greater than the first material.

2. A brake drum comprising:
    (a) a tubular inner member having an interior surface suitable for directly slidingly contacting a brake pad and an exterior surface, the inner member being made from an alloy which includes at least about seventy-five volume percentage of aluminum and between about ten volume percent and about twenty-five volume percent abrasive material;
    (b) a length of wire tightly wrapped in multiple turns around substantially the entire exterior surface, the length of wire having a diameter of between about 0.05 inches to about 0.25 inches, the wire being formed of a high-strength steel alloy; and
    (c) a tubular outer shell molded over and substantially covering the length of the wire, the tubular outer shell including at least one fastener for securing at least a portion of a wheel assembly to the brake drum, the outer shell being made from material which includes at least about seventy-five volume percent of aluminum,
    wherein the wire has a tension of at least about twenty-five foot-pounds following molding of the outer shell.

3. The brake drum of claim 2 wherein the length of wire is tightly wound in multiple layers having a combined thickness of between about 0.1 inches to about 0.4 inches.

4. A vehicle utilizing at least one brake drum of claim 2.

* * * * *